United States Patent

Stump et al.

[15] 3,648,681

[45] Mar. 14, 1972

[54] EXTRANEOUS HEATER PRIMARILY FOR MOTOR VEHICLES OPERATED WITH LIQUID FUEL, PARTICULARLY GASOLINE

[72] Inventors: Eugen Stump, Stuttgart-Unterturkheim; Gerhard Frankle, Grunbach, both of Germany

[73] Assignee: Firma Suddeutsche Kuhlerfabrik Julius Fr. Behr, Stuttgart-Feuerbach, Germany

[22] Filed: Feb. 17, 1970

[21] Appl. No.: 11,980

[30] Foreign Application Priority Data

Feb. 18, 1969 Germany ..................... P 19 07 974.4

[52] U.S. Cl. ............................................ 126/110 B, 431/264
[51] Int. Cl. ........................................................... F24h 3/02
[58] Field of Search .................... 431/72, 264, 265; 126/110, 126/110 B, 116 A

[56] References Cited

UNITED STATES PATENTS 2,964,103  12/1960  Ryder ............................... 431/264 X
2,645,278  7/1953  Holthouse, Sr. et al. ............ 126/110 X
2,757,662  8/1956  Baier et al. ......................... 126/110 B
2,881,363  4/1959  D'Luzansky ....................... 431/264 X

FOREIGN PATENTS OR APPLICATIONS 785,288  10/1957  Great Britain ..................... 126/116 A Primary Examiner—Kenneth W. Sprague
Attorney—Robert H. Jacob

[57] ABSTRACT

Heater primarily for motor vehicles operated with liquid fuel particularly gasoline, having a burner, a flame chimney and a heat exchanger, where a vaporizing nozzle is provided as well as a chamber disposed in front of it into which extends at least the electrode of a spark plug and where means are provided for introducing a partial quantity of the air of combustion into the chamber where the spark plug 31 and opposite electrode 32 are so arranged relative to the chamber that their connecting line passes through the center of the fuel cone 36 which extends from the nozzle 27 and bisects the fuel cone 36 in two locations.

7 Claims, 3 Drawing Figures

Patented March 14, 1972
3,648,681
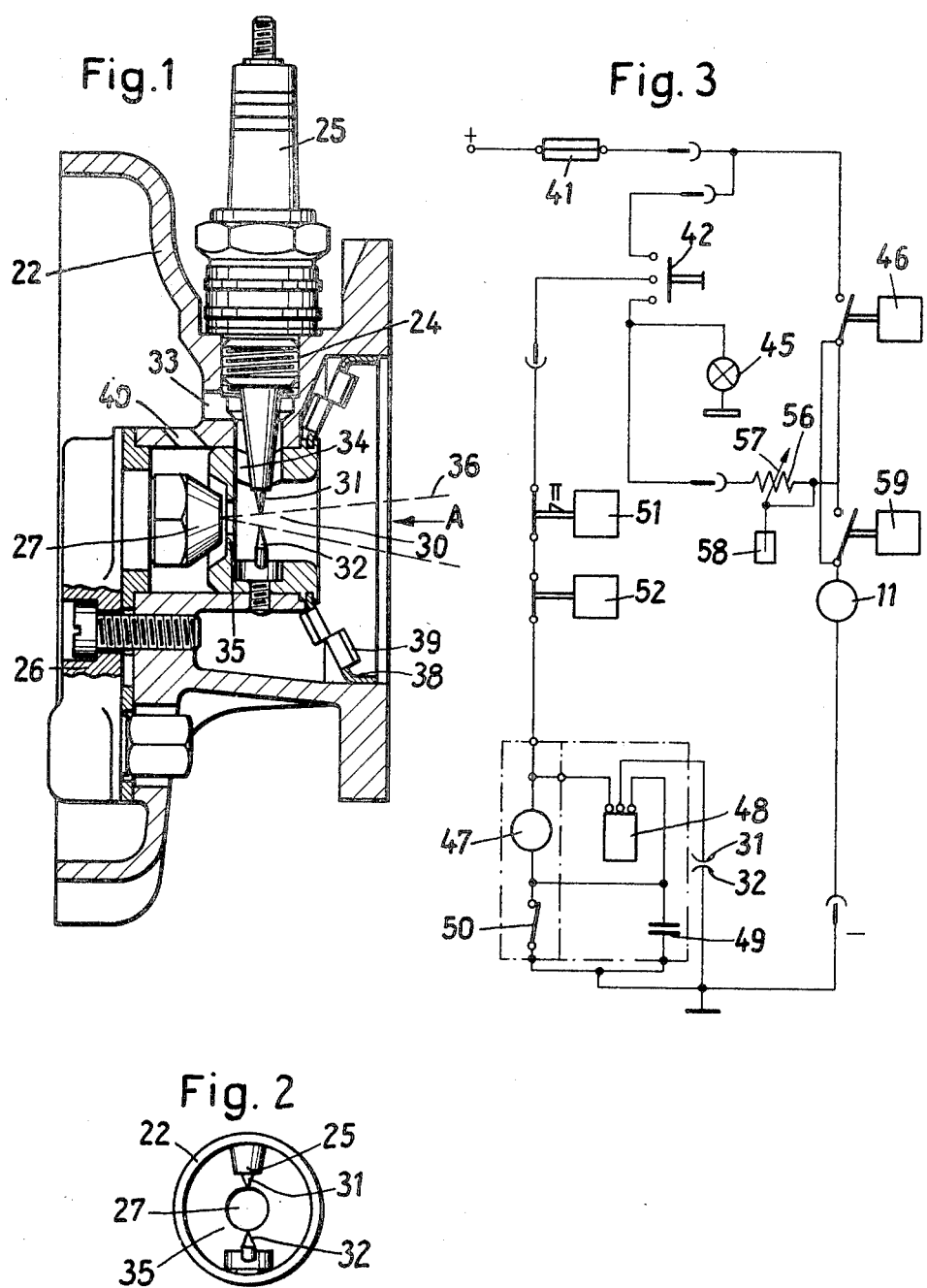
Inventors:
EUGEN STUMP AND
GERHARD FRÄNKLE
BY Robert H. Jacob

EXTRANEOUS HEATER PRIMARILY FOR MOTOR VEHICLES OPERATED WITH LIQUID FUEL, PARTICULARLY GASOLINE

BACKGROUND OF THE INVENTION

The invention relates to liquid fuel heating devices. More in particular, the invention is concerned with a heater operated with liquid fuel, especially gasoline, having a blower motor and ignition device, primarily an extraneous heater for motor vehicles comprising a burner, a flame chimney and a heat exchanger.

It has been proposed in applicants' U.S. Pat. No. 3,543,742 to provide in connection with a heater of this type, a compression vaporizing nozzle as well as a chamber arranged in front thereof into which extends at least one electrode of a spark plug and means for supplying a partial quantity of the air of combustion into the chamber.

In known heaters the spark gap is arranged tangentially with respect to the fuel spray produced by the nozzle. The igniting is achieved by means of a burning chamber of large dimensions and a flame retainer that is arranged in the gasoline or benzine stream. However, in operation the flame retainer accumulates soot and the spark gap tends to form soot bridges. Known arrangements therefore require a burner chamber of large volume.

SUMMARY OF THE INVENTION

It is, therefore, an object of the present invention to deal with the problem of improving a heater in accordance with applicants' earlier patent, particularly with respect to starting at low ambient temperatures. This object is attained in accordance with the invention essentially in that the spark plug electrode and the counter electrode are so arranged relative to the chamber that their connecting line passes through the center of the fuel cone emanating from the nozzle and bisects the fuel cone in two locations.

In accordance with the invention the use of smaller burner chambers is made possible and the installation of flame retainers is no longer required. The arrangement of the ignition electrodes in accordance with the invention effects that the fuel spray or stream is disturbed in two places so that at these places the supplied air together with the fuel stream results in a correspondingly stoichiometric mixture relationship.

It is a particular advantage if in the housing of the nozzle tube additional bores and air supply slots are provided. By blowing a small amount of nozzle air into the space between the nozzle and the chamber the spark gap and the end surface are maintained clean also during continuous operation.

In accordance with a further object of the invention a series resistor is connected in series with the blower motor. By means of this series resistor the starting speed of the air blower motor is decreased thereby obtaining a relatively rich mixture. After igniting the heater the resistor is cut out by means of a trailing switch known per se.

In accordance with a modified embodiment of the invention the series resistor is continually connected with the blower motor and means are provided for changing the resistance value in relation to the temperature of the air that is drawn in. It is of particular advantage if for this purpose an adjustable potentiometer is utilized and a bimetal device serves as a setting element for this potentiometer.

In accordance with a further development of the invention there results an additional improvement of the cold starting characteristics if a pressure switch is arranged in the electrical lead to the blower motor which is operated by the fuel pressure between the fuel pump and the atomizing nozzle.

BRIEF DESCRIPTION OF THE DRAWINGS

Further features and advantages of the invention will become apparent with reference to the drawing in which an embodiment is schematically illustrated and in which:

FIG. 1 is a cross section through the nozzle and ignition device,

FIG. 2 is a view taken along the line of arrow A in FIG. 1, and

FIG. 3 is a circuit diagram of the electrical connections.

DESCRIPTION OF THE INVENTION

In accordance with FIG. 1 a spark plug mounting 24 is provided on the housing portion 22 of the heater into which a spark plug 25 is inserted. A projecting member 26 is connected with the housing 22 in which a pressure nozzle 27 is disposed. In front of the nozzle 27 a chamber 30 is provided into which the spark plug 25 projects at least with its ignition electrode 31. Furthermore, a counter electrode 32 is provided. Between the ignition electrode and the counter electrode the ignition spark jumps over in a known manner when the ignition is turned on. The ignition electrode 31 and the counter electrode 32 are so arranged that their connecting line bisects the cone of fuel in two locations and heats the central axis of the fuel cone 36.

The spark plug mounting 24 has apertures 33 and is designed in such a manner that around the ignition electrode 31 a circular space having an aperture 34 is formed. Between the chamber 30 and the spray nozzle 27 a heat shield plate 35 is provided.

Furthermore, generally annular twist plates 38 having inclined guide blades 39 are provided. These twist plates take care of intimate mixing of the air of combustion with the atomized fuel drawn in and supplied by the combustion air blower.

Furthermore, a bore with an auxiliary air slot 40 is provided in the housing 22. Several such bores or additional air supply slots may be provided. Through these additional air supply slots 40 flows nozzle air that makes possible the cleaning of the nozzle front surface and of the spark gap during operation.

In FIG. 2 which shows a view of the device in accordance with FIG. 1 in the direction of the arrow A corresponding parts are identified by the same reference numerals.

The circuit means for operating the heater in accordance with the invention are shown in FIG. 3. A vehicle connected fuse 41 is provided. The device can be turned on manually by means of a switch 42. It is possible, however, to construct the switch 42 as a contact of a time switch relay (not shown). The switch 42 closes the circuit to the blower motor 11. A control lamp 45 is connected parallel thereto. A temperature trailing related switch 46 is arranged in the circuit of the motor. After turning off the heater the blower continues to run.

In accordance with the invention a series resistor 56 is connected in the circuit with the blower motor 11. The arrangement in this connection may be such that the series resistor 56 is turned off by the trailing switch 46 after ignition. The switch 42 opens or closes the contact to the fuel pump 47 as well as that of an ignition coil 48. The ignition is effected by way of a capacitor 49 in which connection a contact 50 serves as the ignition interrupter which simultaneously and advantageously may be mounted at the fuel pump. Furthermore, a safety thermostat 51 is provided as well as a control thermostat 52 which serves for maintaining a certain fuel temperature that may be preselected.

The apparatus is turned on by means of the switch 42 which causes the permanent ignition, the fuel pump and the blower motor to start. At the same time the control lamp 45 indicates the condition of operation. As a result of heating the trailing switch 46 the contacts thereof close so that as the switch 42 is opened subsequent aerating of the burner chamber takes place. Only after the aerating has been terminated the control lamp 45 becomes extinguished. The overheating thermostat 51 stops the fuel pump 47 and the ignition in the event of excessive temperature. This thermostat has to be set back manually after it has responded.

In accordance with a further feature of the invention the series resistor 56 that is in the form of a potentiometer is equipped with a pickup arm 57. The arm 57 is suitably displaced or moved by a temperature dependent device, for example, a bimetal strip 58. The setting takes place in relation to or as determined by the temperature of the air drawn in.

In accordance with a further development of the invention a pressure switch 59 is provided in the lead to the blower motor 11. This pressure switch 59 is actuated by the fuel pressure in the fuel conduit between the fuel pump 47 and the spray nozzle 27. As a result, when the fuel pressure is below an adjustable value the current supply to the blower motor 11 remains interrupted. Thus the blower driven by the electromotor 11 does not supply air of combustion.

The small quantity of fuel sprayed in as a result of the small fuel pressure can nevertheless ignite because air of combustion is present in the burner space. Due to the existing flame the burner chamber 30 and the spray nozzle 27, as well as the fuel supply conduit heat up so that the fuel becomes thin-flowing and a higher pressure can slowly build up in the fuel supply conduit.

If this pressure rises above a predetermined value, the pressure switch 59 is actuated and the current supply to the electromotor 11 is released. The blower now starts and supplies additional air of combustion into the burner chamber 30. Inasmuch as the burner chamber 30 is now heated by a predetermined amount, the flame can no longer be blown out by the cold air of combustion such as is the case if the blower starts together with the fuel pump 47.

The invention is not limited to the embodiment illustrated and described but it encompasses also all advantageous modifications familiar to the man skilled in the art and particularly all partial and subcombinations of the features described and/or illustrated. The components of the heater not described above are explained in detail in the U.S. Pat. No. 3,543,742.

Having now described our invention with reference to the embodiments illustrated in the drawings, what we desire to protect by letters patent is set forth in the appended claims.

We claim:

1. In a liquid fuel heater for motor vehicles or the like primarily operated with gasoline, comprising a housing defining a heat exchanger, a flame chimney in said heat exchanger, a burner proximate said heat exchanger, a pressure fuel spraying nozzle in aspirating relation to said burner adapted to spray a fuel cone into said burner, a burner chamber adjacent said fuel nozzle in said flame chimney, a fuel pump and a fuel supply conduit connected to said fuel nozzle for supplying liquid fuel to said nozzle, a blower motor for supplying air of combustion, means proximate said fuel nozzle for admitting a partial quantity of air of combustion into said chamber, ignition means including a spark plug having an electrode extending into said chamber and a counter electrode in said chamber on the side opposite said spark plug electrode, an electric circuit connected to said blower motor and to said spark plug for supplying current thereto, said spark plug electrode and said counter electrode being disposed along a connecting line passing through the centerline of the fuel cone emanating from said nozzle and bisecting said fuel cone in two locations.

2. The improvement in a heater in accordance with claim 1, comprising a housing portion extending around said nozzle, and having at least one air aperture proximate and radially of said nozzle.

3. The improvement in a heater in accordance with claim 1, where said blower motor is connected in said electric circuit and a resistor is connected in series with said blower motor.

4. The improvement in a heater in accordance with claim 3, including a trailing switch in said circuit of said resistor operative to disconnect said resistor.

5. The improvement in a heater in accordance with claim 3, where said resistor is continuously connected in series with said blower motor and means are provided for changing the value of said resistor in relation to the temperature of the air drawn in by said blower motor.

6. The improvement in a heater in accordance with claim 5, where said resistor is a potentiometer and said means for changing the resistance value of said resistor include a sliding contact in the form of a pickup arm and a bimetal strip.

7. The improvement in accordance with claim 1 including a pressure switch in the circuit of said blower motor responsive to the fuel pressure in said fuel conduit between said fuel pump and said fuel spraying nozzle.

* * * * *